(12) United States Patent
Liu (10) Patent No.: US 10,149,586 B2
(45) Date of Patent: Dec. 11, 2018

(54) DUST COLLECTOR AND FILTERING DEVICE THEREOF

(71) Applicant: Suzhou Cleva Electric Appliance Co., Ltd., Suzhou, Jiangsu Province (CN)

(72) Inventor: Haiping Liu, Suzhou (CN)

(73) Assignee: Suzhou Cleva Electric Appliance Co., Ltd. (CN)

( * ) Notice: Subject to any disclaimer, the term of this patent is extended or adjusted under 35 U.S.C. 154(b) by 48 days.

(21) Appl. No.: 14/890,242

(22) PCT Filed: May 19, 2014

(86) PCT No.: PCT/CN2014/077781
§ 371 (c)(1),
(2) Date: Nov. 10, 2015

(87) PCT Pub. No.: WO2014/183679
PCT Pub. Date: Nov. 20, 2014

(65) Prior Publication Data
US 2016/0106281 A1 Apr. 21, 2016

(30) Foreign Application Priority Data

May 17, 2013 (CN) .......................... 2013 1 0183770

(51) Int. Cl.
*A47L 9/12* (2006.01)
*B01D 46/52* (2006.01)
(Continued)

(52) U.S. Cl.
CPC ................. *A47L 9/12* (2013.01); *A47L 9/127* (2013.01); *B01D 46/0005* (2013.01); *B01D 46/2414* (2013.01); *B01D 46/525* (2013.01)

(58) Field of Classification Search
None
See application file for complete search history.

(56) References Cited

U.S. PATENT DOCUMENTS 4,787,657 A * 11/1988 Henniger .................. F16L 5/06
174/660
5,783,086 A * 7/1998 Scanlon ................ A47L 7/0042
210/416.1
(Continued)

FOREIGN PATENT DOCUMENTS

CN 1312048 9/2001
CN 101658405 3/2010
(Continued)

OTHER PUBLICATIONS

Search Report for International Application No. PCT/CN2014/077781, dated Aug. 4, 2014.

*Primary Examiner* — Joseph J Hail
*Assistant Examiner* — Brian D Keller
(74) *Attorney, Agent, or Firm* — JK Intellectual Property Law, PA (57) ABSTRACT

A filtering device of a dust collector (i.e, vacuum cleaner) comprises a filter, a rack, an end cap, and a fixed portion. The filter has filter paper, a sealing member, and the end cap, the filter paper being disposed between the end cap and the sealing member. An end hole penetrating the end cap is provided on the end cap, and the filter is mounted on the rack. A center post is provided on the rack, and the center post runs through the end hole. A locking portion is disposed between the end cap and the fixed portion, and the locking portion firmly locks the center post when the fixed portion is fastened to the end cap. The filtering device of a dust collector does not have an elastic interference fit during implementation, and is more reliably secured; and therefore, it does not accidentally fall off during use.

11 Claims, 11 Drawing Sheets

(51) Int. Cl.
*B01D 46/00* (2006.01)
*B01D 46/24* (2006.01)

(56) References Cited

U.S. PATENT DOCUMENTS

| | | | |
|---|---|---|---|
| 6,809,263 B2 * | 10/2004 | Jackson | ................ H02G 3/065 |
| | | | 16/2.1 |
| 8,206,482 B2 | 6/2012 | Williams et al. | |
| 2007/0113529 A1 | 5/2007 | Gierer | |
| 2008/0036206 A1 * | 2/2008 | Li-guo | ................ F16L 37/0985 |
| | | | 285/322 |

FOREIGN PATENT DOCUMENTS

| | | |
|---|---|---|
| CN | 101711657 | 5/2010 |
| CN | 203328636 | 12/2013 |

* cited by examiner

FIG.11 ical solution: a filtering device of the dust collector comprises a filter, a rack, an end cap and a fixed portion; the filter has filter paper and a sealing member; the end cap is disposed on one end of the filter, and an end hole penetrating the end cap is provided on the end cap, the filter is mounted on the rack, a center post is provided on the rack, and the center post runs through the end hole; and a locking portion is disposed between the end cap and the fixed portion, and the locking portion locks the center post when the fixed portion is fastened to the end cap.

US 10,149,586 B2

DUST COLLECTOR AND FILTERING DEVICE THEREOF

CROSS REFERENCE TO RELATED APPLICATIONS

This application is a national stage of International Application No. PCT/CN2014/077781, filed May 19, 2014, and claims benefit of Chinese Patent Application No. CN 201310183770, filed May 17, 2013, both of which are incorporated by reference herein.

TECHNICAL FIELD

The present invention relates to a dust collector and a filtering device thereof.

BACKGROUND ART

A dust collector, also known as a vacuum cleaner, is commonly used household cleaning equipment where dust and chippings are sucked into a dust bucket through working airflow and then the working airflow is exhausted. Therefore, the dust collector needs to have a function of separating working airflow, dust and chippings from air. So far, a filtering device is the most commonly used and effective solution of realizing air and dust separation. The filtering device needs to be frequently dismantled from the dust collector during use. For example, the filtering device of the dust collector, after being used for a period of time and on which a large amount of dust may be accumulated, needs to be dismantled for cleaning and then remounted. In some designs, a filtering member of the filtering device is made of filter paper. After the filter paper is used for a period of time, the surface of the filter paper is accumulated with a large amount of dust, at this moment, the filter paper needs to be replaced so as to ensure normal running of the dust collector. If the filter paper and the filtering device cannot be easily dismantled, therefore, both need to be replaced together. Publication No. CN101711657 discloses a replaceable filtering device which comprises a filtering device rack and which is sheathed on the rack, wherein an elastic end cap on which an end hole is provided is disposed on one end of the filtering device, and wherein when the filtering device is mounted, a support column on the rack penetrates the end hole and enables the end hole to be kept in a region of the support column having a smaller outer diameter. Since mounting and fixing are finished through the elastic end hole in the solution aforementioned, the elastic structure will generate problems of structure aging, elasticity failure or the like after being dismantled, mounted and used repeatedly for a relatively long time. Therefore, the filtering device will possibly fall off in use in case of structure aging or elasticity failure, and moreover, the elastic end cap and the support post are inconvenient to mount and dismantle because of an interference fit there between.

SUMMARY

In order to solve said problem, the present invention provides a filtering device of a dust collector, which is more stable in structure and unlikely to automatically fall off in a using process.

In order to achieve the above objectives, the present invention is embodied by the following technical solution: a filtering device of the dust collector comprises a filter, a rack, an end cap and a fixed portion; the filter has filter paper and Moreover, the present invention also provides the following additional technical solutions:

The fixed portion is a knob, whereas the locking portion is at least claw portions which are integrally formed on the knob.

The at least two claw portions are circumferentially arranged around the center of the knob.

The at least two claw portions are located between the center post and the end hole when locking the center post.

A chamfer is formed at the tail end of each claw portion; a mouth portion is disposed on the end hole, wherein the inner diameter of the mouth portion is gradually decreased from top to bottom, and an arc-shaped buffer region which is matched with the chamfer is formed on the bottom end of the mouth portion.

The knob and the mouth portion are fixed through fastening threads.

The center post is equipped with a head portion which has a cap-like brim portion is disposed on the center post, and the claw portions and the cap-like brim portion are locked by virtue of thrust generated when the fixed portion is fastened to the end cap.

The fixed portion is a knob, an end hole is equipped with a mouth portion, and the knob and the mouth portion are fastened to each other through threads.

The locking portion is at least two buckles which are integrally formed on the mouth portion.

The center post is equipped with a head portion which has a cap-like brim portion, and each buckle and the cap-like brim portion are clamped to each other when the knob is fastened to the mouth portion.

Each buckle is equipped with an inclined top surface, and when the knob is fastened to the mouth portion, the knob pushes the inclined top surface inwards, so that the buckle and the cap-like brim portion are clamped to each other.

The at least two buckles are integrally formed on the side wall of the mouth portion.

Each buckle extends longitudinally downwards from the top end of the side wall of the mouth portion, and has an inclined top surface and a hook portion.

Each buckle can also extend transversely from the bottom end of the side wall of the mouth portion and has an inclined top surface.

A dust collector equipped with the filtering device aforementioned also comprises a negative-pressure air power source, a dust bucket, an air inlet and an outlet, wherein the negative-pressure air power source generates negative pressure, so that dust-collecting air circulates in an air channel between the inlet and the outlet.

Compared with the existing technology, the present invention has the advantages that the filtering device is mounted in the dust bucket of the dust collector by means of the rack, the fixed portion and the locking position. The fixed portion and the locking position are injection molding parts, and the locking portion locks the center post when the fixed portion is fastened to the end cap of the rack. The filtering device does not have elastic interference fit during implementation, so that the filtering device can be fixed more reliably and can bear greater external force when the knob is fastened to the end cap, and therefore, the filtering device is unlikely to accidentally fall off during use.

DETAILED DESCRIPTIONS OF THE PREFERRED EMBODIMENTS

Embodiment 1

Figure 1:
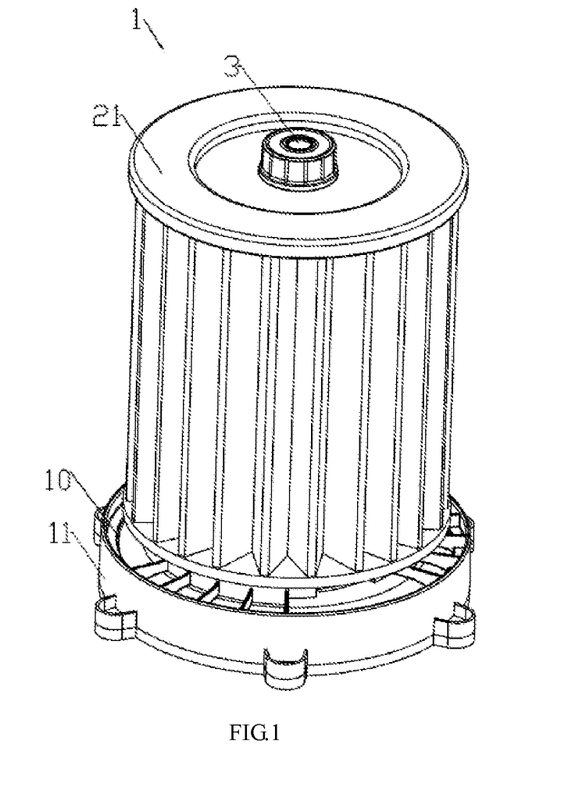
FIG. 1 is a schematic diagram of the filtering device corresponding to Embodiment 1 of the present invention.
Figure 2:
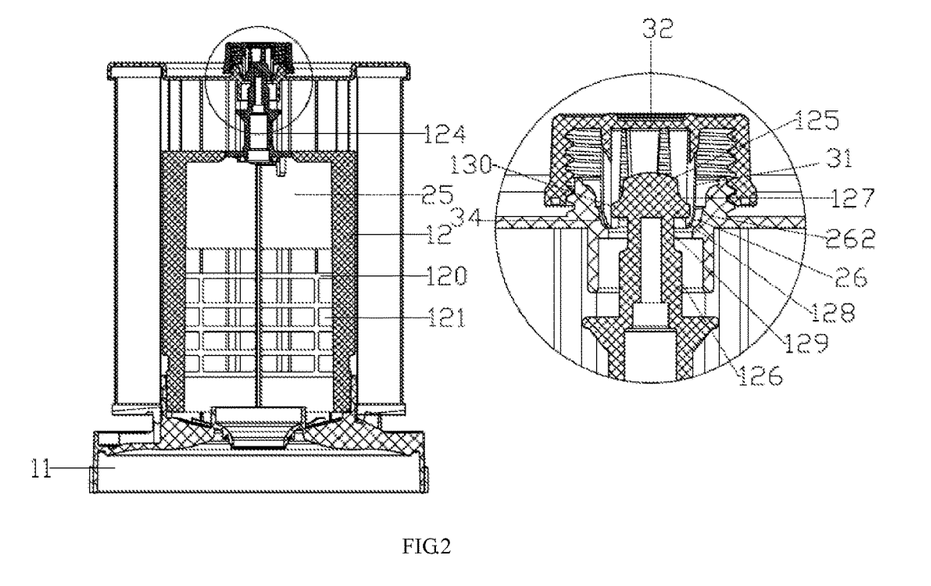
FIG. 2 is a cross-section schematic diagram and a partial enlarged diagram of the filtering device of FIG. 1.
Figure 3:
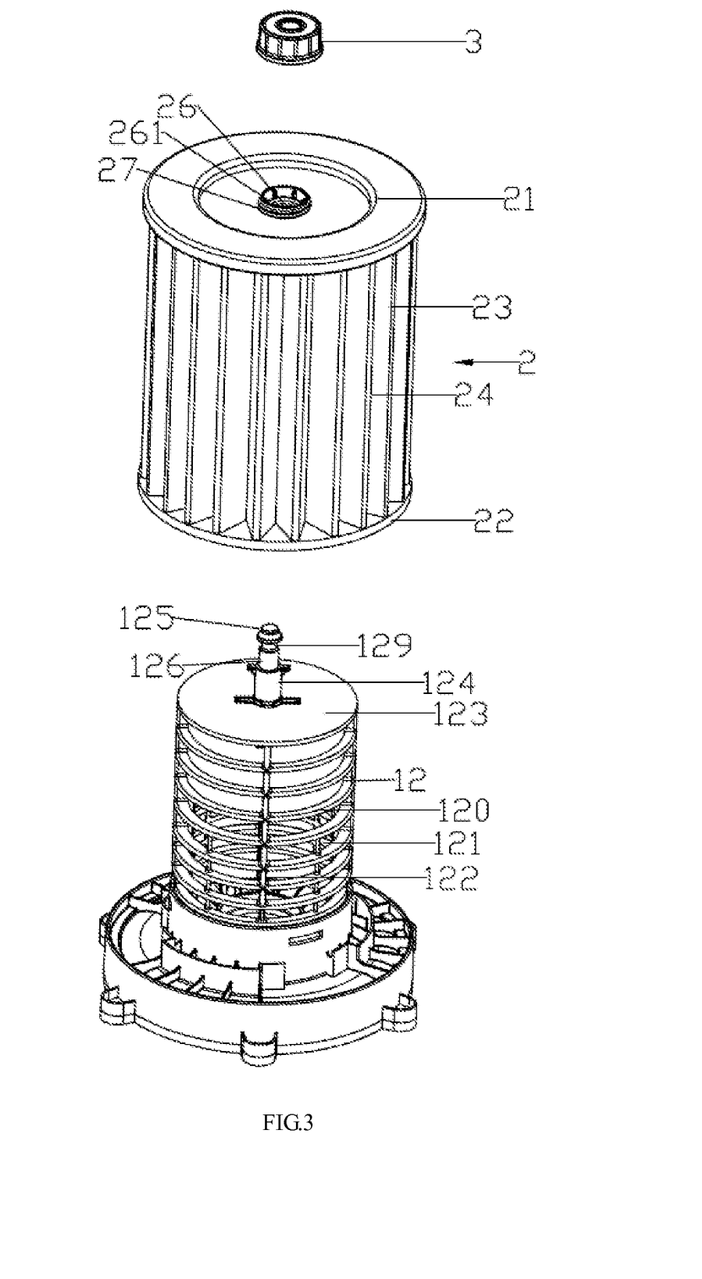
FIG. 3 is an exploded structural schematic diagram of the filtering device of FIG. 1.

By reference to the filtering device 1 of a dust collector (i.e., a vacuum cleaner) as shown in FIG. 1, FIG. 2 and FIG. 3, a rack 10 is disposed on the bottom of a filter 2 and consists of a disc-shaped base 11 and a cylindrical core 12, wherein the core 12 is integrally disposed on the disc-shaped base. The core 12 is equipped with annular ribs 120 which are annularly arranged alternately, an opening 121 is formed between every two adjacent ribs and is configured to allow working airflow of the dust collector and other cleaning equipment to pass through; and ribs 122 which are longitudinally arranged are also disposed around the core 12, wherein each rib 122 is integrally formed with the corresponding annular rib 120 and is connected with the annular rib 120. A circular flat plate 123 is also disposed on the upper end of the core 12, and the exterior of the circular flat plate and the ribs 122 are integrally formed. The center of the circular flat plate 123 protrudes upwards to form a center post 124 which is cylindrical approximately, wherein the center post 124 and the flat plate 123 are integrally formed. A head portion 125 is provided on the upper end of the center post 124, a neck region 126 is disposed below the head portion 125, and the outer diameter of the neck region 126 is less than that of the edge of the head portion 125. The filter 2 is mounted outside the rack 10, an end cap 21 is disposed on the upper end portion of the filter 2, a rubber sealing member 22 is disposed on the bottom of the filter 2, and when the filter 2 is mounted on the rack 10, the rubber sealing member 22 and the base 11 are sealed to each other. Filter paper 23 is disposed between the end cap 21 and the rubber sealing member 22 and is circumferentially arranged between the end cap 21 and the rubber sealing member 22, and ridges 24 which are arranged alternately are formed on the outer surface of the filter paper, wherein the ridges 24 are capable of increasing a filtering region of the filter paper 23 and ensuring that the working airflow flows through the filter 2 more easily. A cylindrical internal space 25 is formed by the filter paper 23. An end hole 26 is provided in the center of the end cap 21, wherein the end hole 26 penetrates the end cap 21 and is communicated with the internal space 25 formed by the filter paper, and a fastening member 27 is provided outside the end hole 26.

Figure 4:
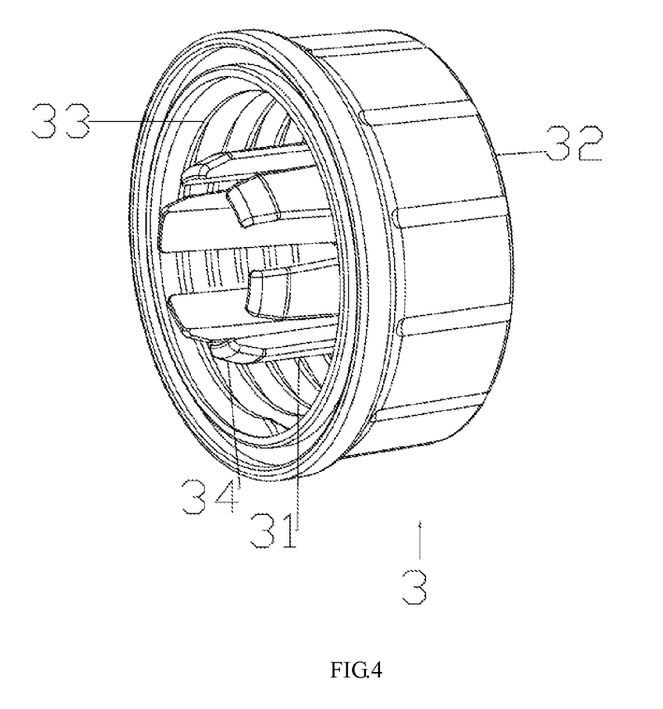
FIG. 4 is an enlarged view of the knob in FIG. 3.

By further reference to FIG. 2, FIG. 3 and FIG. 4, the filtering device aforementioned also comprises a fixed portion 3 and a locking portion 31, wherein the fixed portion 3 is a knob, whereas the locking portion 31 is claw portions integrally formed on the knob 3. A device which is matched with the fastening member 27 is provided on the inner side of the knob 3. Preferably, threads are employed as the fastening member in the present invention and can also be replaced with other fastening members well-known by those skilled in the art. The filter 2 needs to be aligned to the rack 10 first when the filter 2 is mounted, then the core 12 is inserted into the internal space 25 and the center post 124 on the flat plate 123 is enabled to run through the end hole 26 on the end cap 21, and finally the knob 3 and the end cap 21 are screwed together. The knob 3 is approximately cylindrical, a threaded structure which is matched with the exterior of the end hole 26 is provided on the inner surface of the knob, and claw portions 31 are disposed in the middle of the knob 3. Preferably, six claw portions are configured in the present invention, which are disposed on the circumference (taking the center of the bottom 32 of the knob as the center). The claw portions extend from the bottom of the fixed knob to an opening 33 of the knob, and a chamfer 34 is formed on the tail end of each claw portion. The claw portions 31 are located between the center post 124 and the end hole 26 during the assembling process. A mouth portion 261 is disposed outside the end hole 26, wherein the inner diameter of the mouth portion is gradually decreased from top to bottom, and an arc-shaped buffer region 262 (also called the "guide surface" herein) is provided on the bottom of the mouth portion. The bent direction of the arc surface of the arc-shaped buffer region is approximately the same as that of the arc surface of the chamfer 34 of each claw portion. A head portion 125 of the center post is cap-like, wherein the outer diameter of the head portion is gradually increased from top to bottom, a cap-like brim portion 130 is located on the maximal outer diameter part of the head portion, and the outer portion of the head portion extends smoothly and continuously to form an arc-shaped surface 127. The lower side of the head portion 125 of the center post is connected with a neck portion 126, the lower surface 128 of the head portion is perpendicular to the neck portion 126, and a region on which an inward recess 129 is located is formed in a position, on the center post, of the neck portion. When a user rotates the knob 3, the knob 3 moves downwards along the center post 124, and meanwhile drives the claw portions 31 to rotate and move downwards; the chamfer on the tail end of each claw portion 31 moves downwards along the inner surface of the mouth portion 261, wherein the inner diameter of the mouth portion is gradually decreased and the chamfers 34 of the claw portions prop against the arc-shaped buffer region 262 directly and move inwards and downwards along the inner surface of the mouth portion 261; the claw portions 31 move inwards to clamp the cap-like brim portion 130 of the head portion 125 of the center post; and further, as the knob 3 is rotated, the claw portions 34 penetrate the end hole 26 and the tail ends of the claw portions enter a recess region 129 formed on the neck portion 126. At this moment, the claw portions 31 and the head portion 125 of the center post are locked tightly, and the filter 2 is firmly fixed on the rack 10. The knob 3 and the claw portions 31 are injection molding parts. The claw portions are elastic, and therefore, after the knob 3 and the filter are dismantled, the claw portions will recover to original shapes. In conclusion, the knob 3 is fixed with the end cap 21 through threads, the chamfers 34 on the tail ends of the claw portions 31 slide inwards along the arc-shaped buffer region of the mouth portion 261 by means of the thrust generated when the knob 3 and the end cap 21 are screwed together, and finally the claw portions 31 and the center post 124 are locked tightly.

Figure 5:
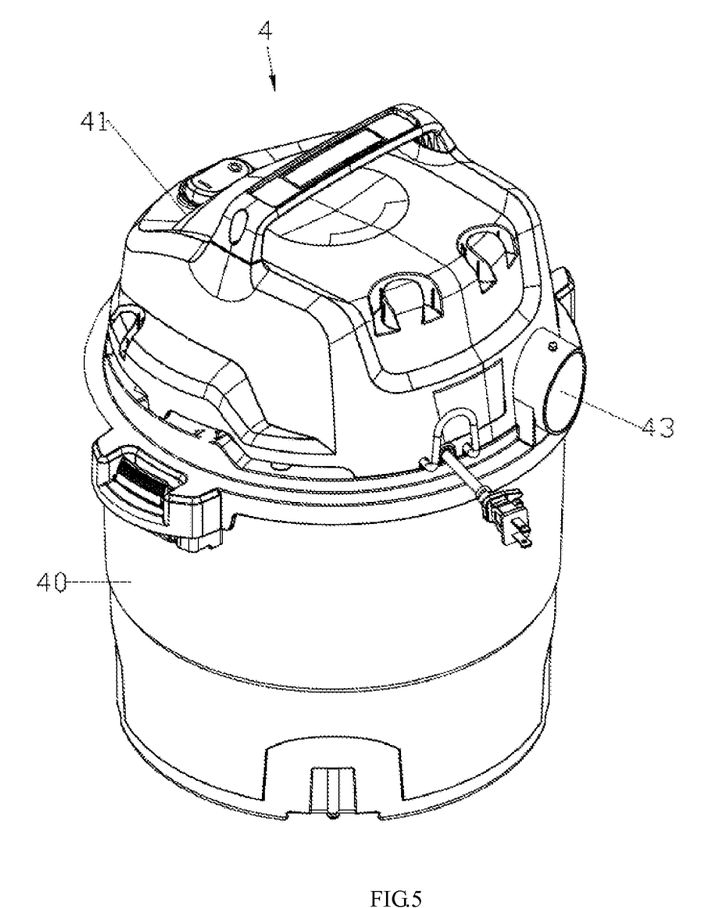
FIG. 5 is a complete schematic diagram of the dust collector applying the filtering device in FIG. 1.
Figure 6:
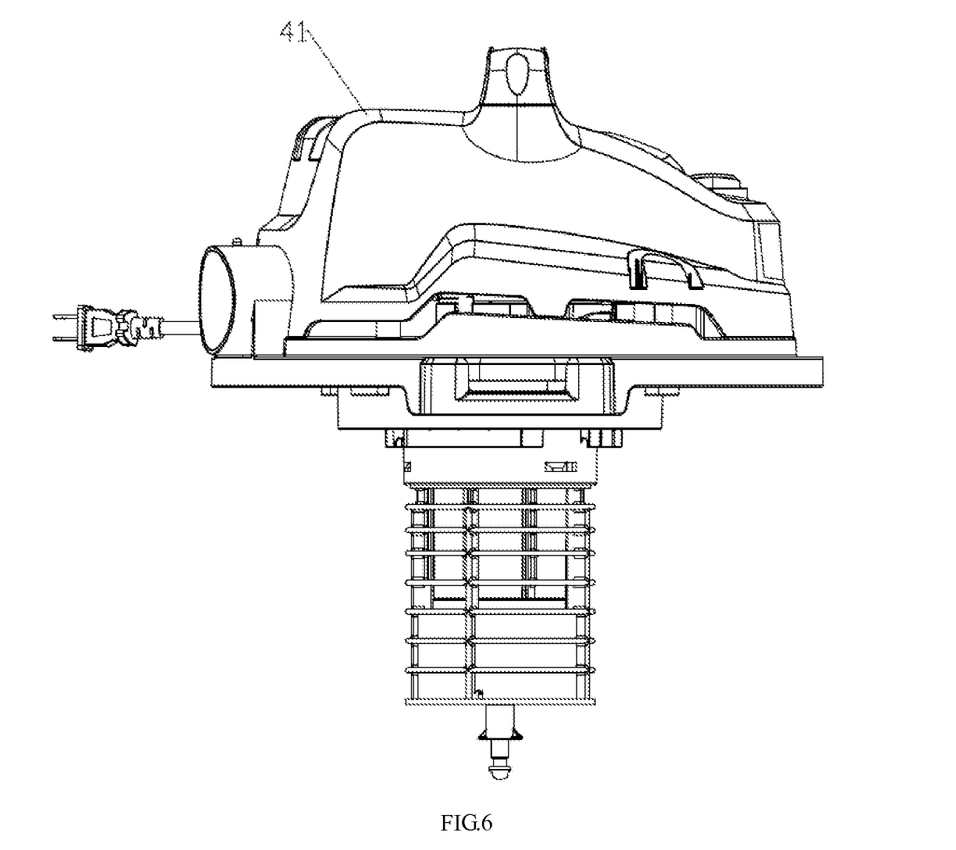
FIG. 6 is a schematic diagram of a machine head portion and the filtering device of FIG. 5
Figure 7:
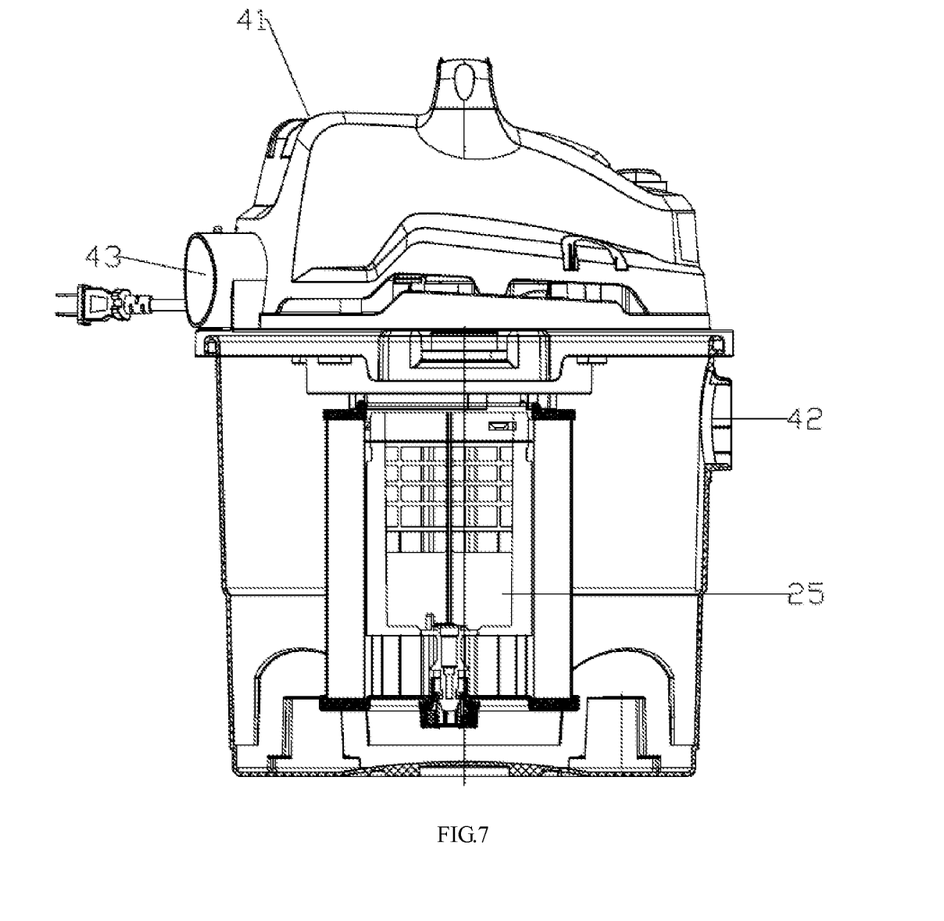
FIG. 7 is a cross-section schematic diagram of the dust collector in FIG. 5.

By reference to the dust collector 4 as shown in FIG. 5, FIG. 6 and FIG. 7, the dust collector is equipped with a dust bucket 40, wherein a machine head 41 is disposed on the upper portion of the dust bucket and is internally provided with a motor and an impeller (as shown in the FIGS.); and the working airflow mixed with dust reaches an airflow outlet 43 from a dust suction inlet 42 through the dust bucket by means of the negative pressure generated when the motor drives the impeller, and an air channel of the dust collector is formed between the dust suction inlet and the airflow outlet. The filtering device 1 of the dust collector aforementioned is mounted in the dust bucket on the lower portion of the machine head 41, and the filter 2 is sheathed on the rack 10 and is fixed on the rack 10 by means of the knob 3. An opening (not shown in the FIGS.) is provided on a base of the machine head. One end of the opening is communicated with an impeller cavity, and the other end of the opening is communicated with the internal space 25 formed by the filter paper 23. When the dust collector works, the working airflow enters the dust bucket from the dust suction inlet 42, and then enters the internal space 25 from the outside of the filter paper 23; chippings carried by the working airflow are deposited on the filter paper; and finally clean airflow is exhausted from an outlet 43 of the dust collector.

Embodiment 2

Figure 8:
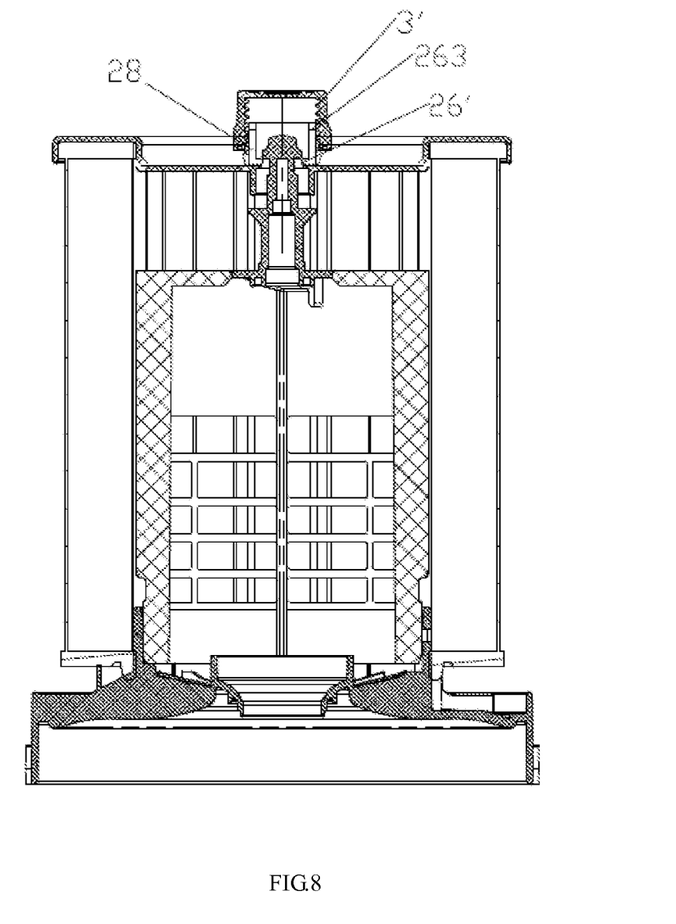
FIG. 8 is a sectional view of the filtering device corresponding to Embodiment 2 of the present invention in an unlocked state.
Figure 9:
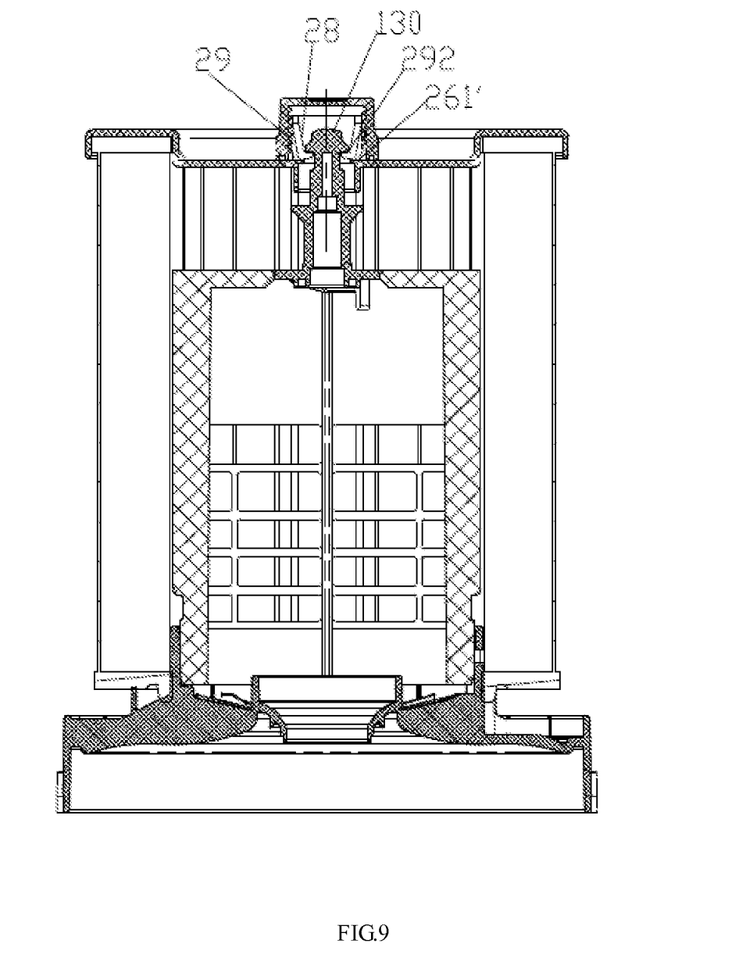
FIG. 9 is a sectional view of the filtering device of FIG. 8 in an unlocked state.

Embodiment 2 is approximately the same as the structures of the dust collector and the filtering device thereof disclosed by Embodiment 1, and the difference just lies in that the structures of the end hole of the end cap, the fixed portion and the locking portion in the filtering device slightly change. The different structures will be described in detail below.

The end hole 26' in this embodiment runs through the end cap 21' as well and is equipped with a mouth portion 261'. However, the mouth portion 261' is formed as a hollow straight pipe approximately, and therefore, is basically consistent in size of the inner diameter.

The fixed portion in this embodiment is a knob 3', whereas the locking portion is at least two buckles 28 which are disposed on the mouth portion 261'. The knob 3' and the mouth portion 261' are fastened in a threaded meshing manner as well. The at least two buckles 28 are integrally formed on the side wall 263 of the mouth portion 261' and extend downwards from the top end of the side wall 263. Each buckle 28 is equipped with an inclined top surface 29 extending longitudinally, and a hook portion 292 extending inwards is formed on the tail end of each buckle 28. In this embodiment, two buckles 28 are configured and are disposed in the diameter direction of the mouth portion 261'.

Therefore, when the knob 3' is fastened to the mouth portion 261', the knob 3' will push the inclined top surface 29 of the buckle 28 gradually inwards in a process of screwing downwards, until the hooks 292 of the buckles 28 are buckled to the lower side of the cap-like brim portion 130 and are mutually clamped, and therefore the conversion of the filtering device from an unlocking state to a locking state is finished.

Embodiment 3

Figure 10:
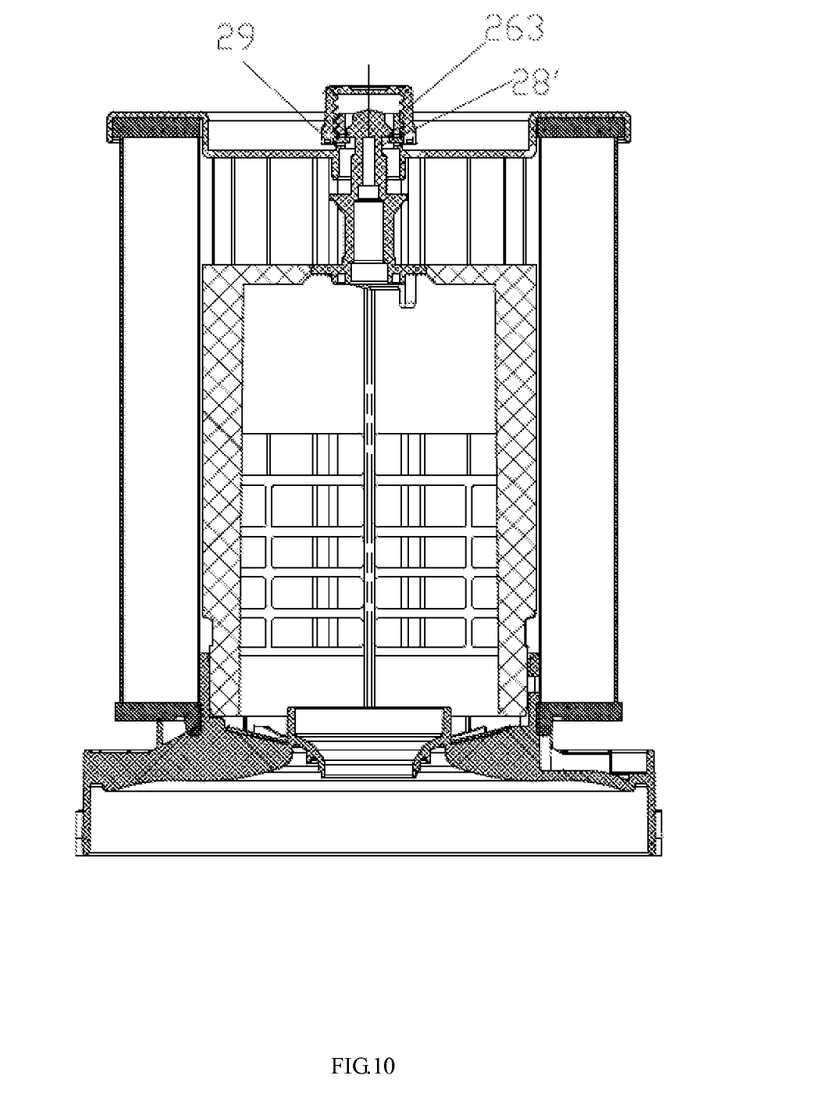
FIG. 10 is a sectional view of the filtering device corresponding to Embodiment 3 of the present invention in an unlocked state.
Figure 11:
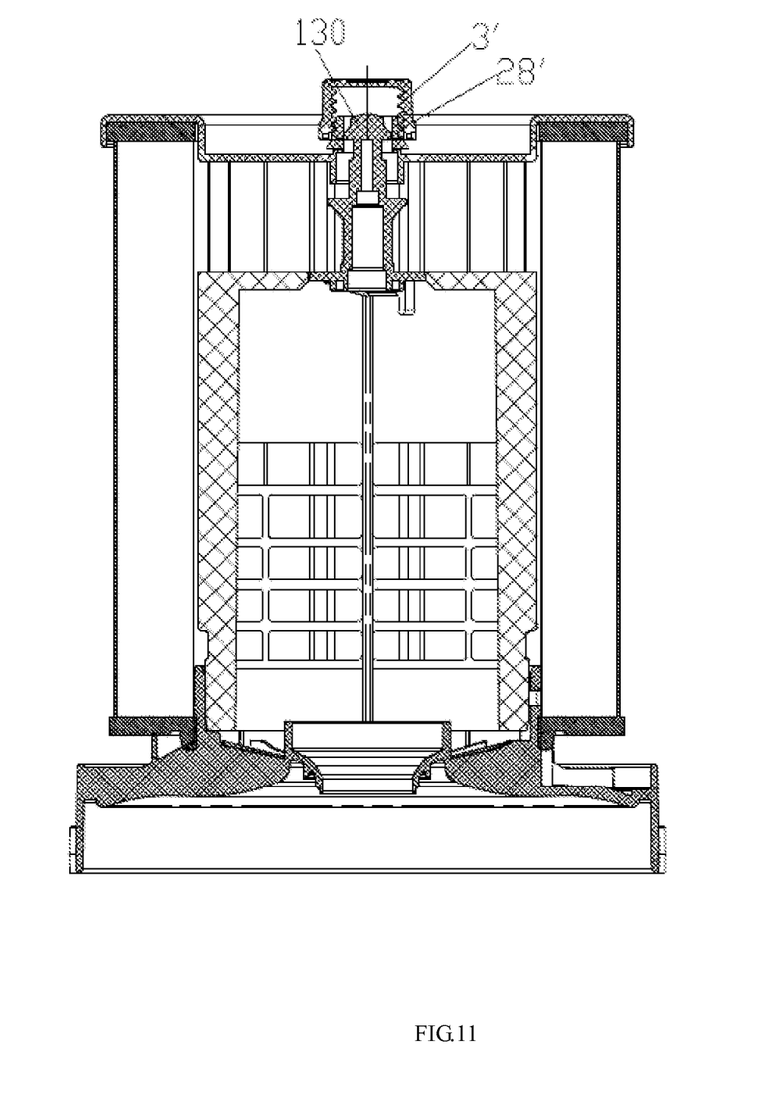
FIG. 11 is a sectional view of the filtering device of FIG. 10 in a locked state.

The difference between Embodiment 3 and Embodiment 2 just lies in that the structures of the buckles are different and are explained in detail as follows: the buckles 28' in this embodiment are integrally formed on the side wall 263 of the mouth portion 261' as well, and also two buckles 28 are configured and are disposed in the diameter direction of the mouth portion 261'. The difference between Embodiment 3 and Embodiment 2 is that each buckle 28' extends from the bottom end of the side wall 263 outwards (transversely) and form an inclined top surface 29' disposed obliquely on the outer side of the side wall. Therefore, when the knob 3' is fastened to the mouth portion 261', the knob 3' will push the inclined top surface 29' of the buckle 28' gradually inwards in a process of screwing downward, until the buckles 28' are buckled to the lower side of the cap-like brim portion 130 and are clamped mutually, and therefore the conversion of the filtering device from the unlocking state to the locking state is finished.

The aforementioned embodiments are preferred embodiments of the present invention, but the protection scope of the present invention is not limited thereto, and all alterations made in accordance to the spirit essence of the present invention should fall into the protection scope of the present invention.

The invention claimed is:

1. A dust collector device comprising:
    a dust collector having a rack including an axially-extending center post; and
    a filtering device including:
        a filter having a filter paper and a sealing member, the filter being mounted on the rack;
        an end cap defining an end hole, the end cap being disposed on one end of the filter with the center post penetrating the end cap, the end cap including external threads located around the end hole and a guide surface located between the end hole and the external threads;
        a fixed portion including a fixed knob having internal threads threadably fastenable to the external threads of the end cap so as to cover the end hole; and
        a locking portion integrally formed with and extending substantially axially from the fixed portion and opposing the internal threads, and when the fixed portion is threadably fastened to the end cap, a distal end of the locking portion is movable radially inwardly due to contact with the guide surface of the end cap thereby locking the locking portion to the center post.

2. The dust collector according to claim 1, wherein the dust collector includes a negative-pressure air power source, a dust bucket, an air inlet, and an outlet, wherein the negative pressure generated by the negative-pressure air power source enables dust-collecting air to circulate between the inlet and the outlet.

3. The dust collector according to claim 1, wherein the locking portion is at least two claw portions which are integrally formed on the fixed knob.

4. The dust collector according to claim 1, wherein guide surface is a mouth portion.

5. A filtering device of a dust collector for attachment to a rack including an axially-extending center post, the filtering device comprising:
- a filter having a filter paper and a sealing member, the filter being mounted on the rack;
- an end cap defining an end hole, the end cap being disposed on one end of the filter with the center post penetrating the end cap, the end cap including external threads located around the end hole and a guide surface located between the end hole and the external threads;
- a fixed portion including a fixed knob having internal threads threadably fastenable to the external threads of the end cap so as to cover the end hole; and
- a locking portion integrally formed with and extending substantially axially from the fixed portion and opposing the internal threads, and when the fixed portion is threadably fastened to the end cap, a distal end of the locking portion is movable radially inwardly due to contact with the guide surface of the end cap thereby locking the locking portion to the center post when the fixed portion is threadably fastened to the end cap.

6. The filtering device of the dust collector according to claim 5, wherein the locking portion is at least two claw portions which are integrally formed on the fixed knob.

7. The filtering device of the dust collector according to claim 6, wherein at least two claw portions are circumferentially arranged around a center of the fixed knob.

8. The filtering device of the dust collector according to claim 6, wherein when the claw portions lock the center post, the claw portions are located between the center post and the end hole.

9. The filtering device of the dust collector according to claim 8, wherein a chamfer is formed on the distal end of each claw portion; the guide surface is a mouth portion disposed around the end hole, and an inner diameter of the mouth portion is gradually decreased from a top to a bottom of the mouth portion, and an arc-shaped buffer region matched with the chamfer is formed on the bottom.

10. The filtering device of the dust collector according to claim 6, wherein said center post is equipped with a head portion, the head portion has a cap-like brim portion, and the claw portions and the cap-like brim portion are thrust-locked when the fixed portion is fastened to the end cap.

11. The filtering device of the dust collector according to claim 5, wherein the guide surface is a mouth portion.

* * * * *